(12) United States Patent
Pang et al.

(10) Patent No.: US 12,457,179 B2
(45) Date of Patent: Oct. 28, 2025

(54) CONTROL NETWORK FOR MOBILE ROBOTS

(71) Applicant: ABB Schweiz AG, Baden (CH)

(72) Inventors: Zhibo Pang, Västerås (SE); Krister Landernäs, Hallstahammar (SE); Ognjen Dobrijevic, Västerås (SE); Pawel Wiatr, Upplands Väsby (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/553,775

(22) PCT Filed: Apr. 9, 2021

(86) PCT No.: PCT/EP2021/059278
§ 371 (c)(1),
(2) Date: Oct. 3, 2023

(87) PCT Pub. No.: WO2022/214193
PCT Pub. Date: Oct. 13, 2022

(65) Prior Publication Data
US 2024/0187356 A1    Jun. 6, 2024

(51) Int. Cl.
*G06F 13/00*    (2006.01)
*G01C 21/20*    (2006.01)
(Continued)

(52) U.S. Cl.
CPC ............ *H04L 47/83* (2022.05); *G01C 21/206* (2013.01); *G05D 1/692* (2024.01); *H04L 41/147* (2013.01); *H04W 4/02* (2013.01)

(58) Field of Classification Search
CPC ... H04L 47/83; H04L 41/147; H04L 41/0897; H04L 41/12; H04W 4/02; G01C 21/206; G05D 1/692
(Continued)

(56) References Cited

U.S. PATENT DOCUMENTS 10,809,734 B2 *  10/2020  De Castro ............ G05D 1/0248
11,252,547 B2 *   2/2022  Pattan .................... H04W 4/08
(Continued)

FOREIGN PATENT DOCUMENTS

WO    2020134733 A1    7/2020

OTHER PUBLICATIONS

Wireless Networks; 2016 Ninth IEEE International Workshop on Selected Topics in Mobile and Wireless Computing; Oct. 19, 2016; 8 Pages.
(Continued)

*Primary Examiner* — Kenneth R Coulter
(74) *Attorney, Agent, or Firm* — Whitmyer IP Group LLC (57) ABSTRACT

A control network for supporting one or more mobile robots operable in a facility includes: a fleet management system authorized to perform path planning and path execution for the mobile robots; and a network management system authorized to configure and perform resource allocation in an access network, which is operable to provide the mobile robots with wireless connectivity in the facility. The respective authorities of the FMS and NMS are mutually exclusive, and the FMS is configured to generate, on the basis of the path planning, a predictive network resource request and share this with the NMS. A vertical application layer server is configured to generate a network resource request which specifies a future location of said one or more VAL UEs. A network resource management server is configured to generate a QoS forecast for one or more VAL UEs.

15 Claims, 2 Drawing Sheets

(51) Int. Cl.
*G05D 1/692* (2024.01)
*H04L 41/147* (2022.01)
*H04L 47/83* (2022.01)
*H04W 4/02* (2018.01)

(58) Field of Classification Search
USPC .................................. 709/226, 238, 239
See application file for complete search history.

(56) References Cited

U.S. PATENT DOCUMENTS

| | | | |
|---|---|---|---|
| 11,592,299 B2* | 2/2023 | Sørensen | G01C 21/32 |
| 11,729,590 B2* | 8/2023 | Pattan | H04L 41/5058 |
| | | | 370/329 |
| 2020/0050206 A1 | 2/2020 | Deyle et al. | |
| 2020/0178052 A1* | 6/2020 | Pattan | H04W 80/12 |
| 2020/0293049 A1 | 9/2020 | De Castro | |
| 2021/0293548 A1* | 9/2021 | Sørensen | G01C 21/206 |
| 2022/0103991 A1* | 3/2022 | Pattan | H04L 41/5054 |
| 2024/0012429 A1* | 1/2024 | Pang | B25J 9/1676 |

OTHER PUBLICATIONS

Fikret Sivrikaya et al.; Reciprocal impact of autonomous vehicles and network resource management; 2017 IEEE Vehicular Networking Conference; Nov. 27, 2017; 4 Pages.

International Preliminary Report on Patentability; Application No. PCT/EP2021/059278; Completed: Jul. 13, 2023; 17 Pages.

3rd Generation Partnership Project; Technical Specification Group Core Network and Terminals; Service Enabler Architecture Layer for Verticals (SEAL); Application Programming Interface (API) specification; Stage 3 (Release 16), 3GPP Draft; C3-202444, 3rd Generation Partnership Project (3GPP), Mobile Competence Centre; 650, Route Des Lucioles; F-06921 Sophia-Antipolis Cedex ; France; May 4, 2020; 76 Pages.

* cited by examiner

CONTROL NETWORK FOR MOBILE ROBOTS

TECHNICAL FIELD

The present disclosure relates to the field of mobile robot control. In particular, it discloses a control network for supporting one or more mobile robots which operate in a facility, wherein the control network includes a fleet management system and a network management system.

BACKGROUND

Mobile robots (MRs) include automated guided vehicles (AGVs) and autonomous mobile robot (AMRs). When a large number of MRs are deployed in an industrial facility, such as a factory, warehouse, port or container terminal, a fleet management system (FMS) may be used to control and manage the MRs collectively. The MRs are connected to the FMS through a wireless network. To meet the increasing needs for reliability, latency control, security and coverage, more complex wireless networks are applied, which may in turn be managed by a network management system (NMS). The general-purpose technologies 5G (3GPP NR) and Wi-Fi 6 (IEEE 802.11ax) are examples of suitable wireless networks, as are several industrial-specific wireless technologies including WIA-FA (Wireless Networks for Industrial Automation—Factory Automation, specified in IEC PAS 62948 and others).

In a setting of the type outlined above, WO2019134733A1 relates to robot control monitoring and optimization in mobile networks in support of remote robot control services. An analytics system provides service quality information to a cloud-based remote control system, which issues control requests to a local control unit for control of a robotic device, and a mobile communication network connects the cloud-based remote control system with the local control unit. Service event information is collected and associated with control requests issued by the cloud-based remote control system. On the basis of the collected service event information, a processing unit correlates the service event information with the associated control request, calculates at least one key performance indicator from the result of correlation, analyzes the at least one key performance indicator for identification of a poor service quality incidence, and generates a service quality report based on the result of analysis upon occurrence of a poor service quality incidence Due to the inherent mobility of the MRs and variability of the environment surrounding each MR, the performance of wireless communication is rapidly and noticeably affected by the changing status of the fleet. For example, network congestion may occur if too many MRs gather in the vicinity of a single wireless access point. In another scenario, the quality of service (QOS) of a wireless link may drop when the MRs move to an area where the network coverage is poorer as a result of, say, shading or absorption caused by nearby obstacles, insufficient signal strength at corners of the facility, or by multipath propagation due to reflective surfaces.

US20200050206A1 discloses a mobile robot configured for operation in a commercial or industrial setting, such as an office building or retail store. The robot can patrol one or more routes within a building, and it can detect violations of security policies by objects, building infrastructure and security systems, or individuals. In response to the detected violations, the robot can perform one or more security operations. The robot can generate or update one or more semantic maps for use by the robot in navigating an area and for measuring compliance with security policies. In particular, it may select a route based on building information, such as one or more floor maps and information describing wireless or Wi-Fi™ coverage within a floor. In some embodiments, the mobile robot can select a route based on a strength of a wireless signal within the building floor, for instance avoiding 'dead' zones or prioritizing portions of the floor that have relatively stronger signal coverage.

Accordingly, US20200050206A1 presents technologies that allow the robot to physically avoid zones insufficiently covered by the radio infrastructure, but it does not address issues such as network congestion or QoS fluctuations. Further, the existing setup where route selection is delegated to each mobile robot is poorly suited for managing a fleet of robots efficiently.

SUMMARY

One objective of the present disclosure is to make methods and devices available that achieve a reasonably deterministic (e.g., bounded latency, limited amount of jitter) performance of the network and thus do not constrain the productivity of the fleet. Another objective is to allow a coordination of the control strategies practiced by the FMS and the network configurations decided by the NMS, possibly with account taken of the status of fleet, network and the environment. It is a further objective to propose such methods and devices by which relevant information in the NMS and the FMS can be exchanged efficiently (to reduce the network communication overhead) and timely (to adapt to more dynamic conditions and faster operation). Such timely exchanged information may relate to future locations of the mobile robots. It is finally an object to ensure interoperability of the proposed devices, e.g., between mobile robots, an FMS and an NMS from different manufacturers.

At least some of these objectives are achieved by the invention as defined by the independent claims. The dependent claims relate to advantageous embodiments of the invention.

In a first aspect of the invention, there is provided a control network for supporting one or more mobile robots operable in a facility. The control network includes an FMS authorized to perform path planning and path execution for the mobile robots and an NMS authorized to configure and perform resource allocation in an access network, which is operable to provide the mobile robots with wireless connectivity in the facility. The respective authorities of the FMS and the NMS are mutually exclusive, e.g., the NMS is not authorized to plan and execute paths, and the FMS has no authority to allocate network resources. The FMS is configured to generate, on the basis of its path planning, a predictive network resource request and share this with the NMS.

The sharing of the predictive network resource request allows the NMS to adapt the network configuration and/or resource allocation in such manner that the access network provides the mobile robots with connectivity at the locations they will occupy according to the path planning. This enables more efficient usage of the access network since available resources can be concentrated to those locations where they will be needed and consumed.

In some embodiments, the network resource request may include a mobile robot identity and a QoS requirement. The location of the identified mobile robot can be known by the NMS by being included in the network resource request. Alternatively, the NMS can subscribe to location information for the identified mobile robot.

In some embodiments, the FMS obtains network-related information from the NMS and adapts its path planning accordingly. For example, the NMS may generate a QoS forecast and share this with the FMS.

In some embodiments, the control network includes a publication-subscription service configured to facilitate the sharing of information between the FMS and NMS. In particular, the network resource request and/or the QoS forecast can be exchanged over the publication-subscription service.

In a second aspect of the present invention, there is provided a computer-implemented method for supporting one or more mobile robots operable in a facility equipped with an access network. The method comprises: executing a path-planning process on the basis of input specifying at least one task of the mobile robots; authorizing the path-planning process to control movement of the mobile robots; deriving a predictive network resource request from an output of the path-planning process; executing a network resource allocation process, which is independent from the path-planning process, on the basis of the predictive network resource request; and authorizing the network resource allocation process to configure the access network.

In a third aspect, there is provided a vertical application layer (VAL) server configured to share a network resource request with a network resource management (NRM) server. The network resource request pertains to one or more VAL user equipments (VAL UEs) and specifies: an identity of the VAL server, at least one identity for said one or more VAL UEs, a QoS requirement and a future location of said one or more VAL UEs.

In a fourth aspect of the invention, there is provided an NRM server configured to generate a QoS forecast and share this with a VAL server. The QoS forecast specifies: a QoS indicator and at least one identity for one or more VAL UEs to which the QoS indicator pertains and/or a location to which the QoS indicator pertains.

The second, third and fourth aspects of the invention share many of their advantages and effects with the first aspect. These aspects can be implemented with a corresponding degree of technical variation.

The invention further relates to a computer program containing instructions for causing a computer, or the mobile robot control network in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
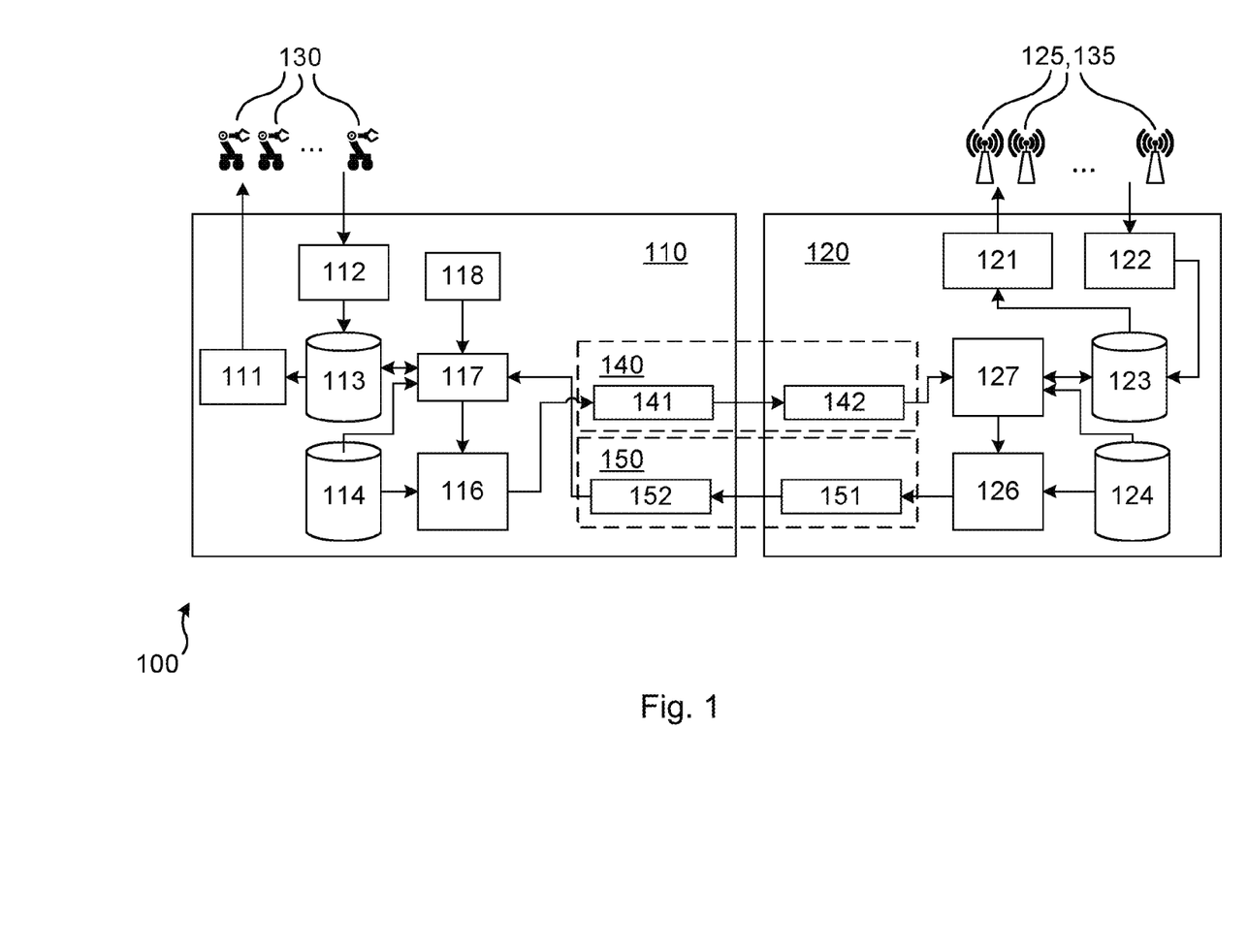
FIG. 1 shows a control network including an FMS and an NMS for supporting a plurality of mobile robots.

FIG. 1 is a block diagram of a control network 100 for supporting a plurality of mobile robots 130 which operate in a facility. The facility may be a building, factory, plant, warehouse, (partially outdoor) industrial environment, mine or the like. In some embodiments, the public road network is not a "facility" in this sense. The control network 100 comprises a fleet management system (FMS) 110 and a network management system (NMS) 120.

A basic responsibility of the NMS 120 is to configure an access network and perform resource allocation therein. The NMS 120 may have the exclusive authority to configure the access network at runtime. The access network comprises wireless access points (WAPs) 125 installed in the facility to provide the mobile robots 130 with wireless connectivity. The connectivity may be provided over air interfaces that each extends from one of the WAPs 125 to a wireless field device (WFD) 135 in a mobile robot 130. A WFD 135 can constitute a (mobile) station of Wi-Fi™ (IEEE 802.11 series), a field device of WIA-FA, or a user equipment (UE) of a cellular network such as 3GPP NR. Correspondingly, a WAP 125 can be the access point of Wi-Fi™, the access device of WIA-FA, or a base station (NB, eNB, gNB) of the cellular network. The MRs 130 may connect to different WAPs 125 as they move between different areas of the facility, which may be facilitated by per se known handoff techniques. Additionally, the access network may be used to communicate instructions from the FMS 110 to the mobile robot 130, including planned motion paths and the assigned utility tasks.

An example internal structure of the NMS 120 is shown in FIG. 1. The structure—like that of the FMS 110 to be described below—is to be understood as a functional one. More precisely, it may correspond to an arrangement of physical components or an arrangement of portions of executing software code. The connectors in FIG. 1 represent typical flows of information occurring when the NMS 120 operates according to the present disclosure. The layout of these flows does not preclude that information may travel along other paths in the internal structure, as is the case, e.g., when multiple components are connected to a common network with a star or mesh topology.

In the NMS 120, a network monitor 122 collects status information from the WAPs 125 in the facility and WFDs 135 in the MRs 130, and stores it in a network database 123. In many cases, even if the WAPs 125 and WFDs 135 are deployed and owned by the same entity as the MRs 130 and facility, the FMS 110 does not have direct access to the low-level status information, which is the preferred basis for predicting network QoS. It is particularly common in newer wireless technologies to restrict access to such low-level status information, including 5G, WIA-FA and Wi-Fi 6.

In the NMS 120, furthermore, a network configurator 121 configures the WAPs 125 and WFDs 135 according to a resource allocation plan. The network configurator 121 may access the resource allocation plan in the network database 123.

A network resource allocator 127 in the NMS 120 generates the resource allocation plan on the basis of the collected status information relating to the wireless network, which it retrieves from the network database 123. The resource allocation plan may be generated, further, in view of maps of the facility supplied by a map database 124. The resource allocation plan may be generated, furthermore, in view of a predictive network resource request received from the FMS 110, as described in more detail below. The network resource allocator 127 stores the generated resource allocation plan in the network database 123.

In the NMS 120, there is further provided a network QOS forecaster 126. The QOS forecaster 126 is configured to predict the achievable network QoS based on the resource allocation plan and optionally based on map information relating to the facility.

Turning to the FMS 110, this system of the control network 100 is responsible for path planning and path execution with regard to the MRs 130. The FMS 110 may have task planning as a further responsibility, wherein utility tasks (production, processing, material handling, transport etc.) are assigned to one or more of the mobile robots 130. Such tasks may be elements of a higher-level task or a project which the FMS 110 is to carry out. The path planning may support the assigned tasks or may be non-productive, e.g., related to maintenance or parking of the MRs 130. The path execution may include providing movement commands to the mobile robots 130 over the access network. The FMS 110 may have the exclusive authority to perform path planning and path execution during runtime. The FMS 110 or some section thereof may execute Robot Operating System 1 or 2 (ROS1, ROS2).

Within the FMS 110, there is provided a fleet monitor 112, which collects status information from the MRs 130 and stores it in a fleet database 113.

A task planner 118 generates the tasks to be performed by the MRs 130 according to the higher-level inputs, e.g., a production plan from a manufacturing execution system (not shown).

A path planner 117 generates the paths for the MRs 130 and stores them in the fleet database 113. The path planner 117 may be configured to generate the paths according to the collected status information of the MRs 130, which it may retrieve from the fleet database 113, and according to tasks assigned to the MRs 130 by the task planner 118. The path planning may further be based on maps of the facility, which are available from a map database 114. Alternatively or additionally, the path planning may further be based on an achievable (forecasted) QoS of the wireless network indicated by the QOS forecaster 126 in the NMS 120.

In the FMS 110, furthermore, a path executor 111 controls the MRs 130 so as to implement the paths from the fleet database 113 that were generated by the path planner 117 (see above), also taking into account the status of MRs 130 from the fleet database 113.

There is also provided a network demand forecaster 116, which is operable to predict a quantity, type and/or location of the required network resources. The network demand forecaster 116 may base this prediction on the MR paths determined by the path planner 117 and maps of the facility, the latter being available from the map database 114.

To facilitate efficient and safe communication between the FMS 110 and NMS 120, the control network 100 further includes a publication-subscription (or PubSub) service 140, 150. The publication-subscription service 140, 150 is configured to facilitate, at least, the sharing of the predictive network resource request and/or the QoS forecast between the FMS 110 and the NMS 120.

The publication-subscription service 140, 150 is characterized by asynchronous message exchange, in the sense that the receiving side may receive the message at a time independent of, and possibly much after, the time when the sending side posts the message. The publication-subscription service 140, 150 may furthermore be characterized by a greater decoupling of the sending and receiving sides than in communication according to conventional unicast or broadcast transmission, which is initiated by the sending side, and in message polling at the instance of the receiving side. Indeed, the sending side (or publisher) may post messages to a storage that belongs neither to itself nor the receiving side (or subscriber) but is provided by an intermediary (e.g., middleware). Implementations of the present invention may be compliant with the Data Distribution Service (DDS) standard or the Open Platform Communications Unified Architecture (OPC UA) PubSub protocol, or alternatively be compliant with specifications for the Network Exposure Function (NEF) Northbound Interface of 3GPP NR if a cellular connectivity framework is applied. A still further characteristic of publication-subscription services in general is that it is not uncommon for the publisher to be unaware of the identities of the subscribers, which may be granted access to a certain class of messages by virtue of their roles (cf. role-based access control).

The publication-subscription service 140, 150 may be structured into topics or classifications. FIG. 1 illustrates two example topics, namely, a network demand topic 140 and a network QoS topic 150. Generally, the network demand topic 140 describes the predictive requests, from the FMS 110 to the NMS 120, for wireless network resources such as bandwidth and QoS for a certain WFD 135; the request may be limited to a certain time period and/or a certain spatial area. The network QoS topic 150, for its part, describes the predictive achievable QoS, from the NMS 120 to the FMS 110, by the wireless network for a certain WFD 135; this prediction or forecast may be limited to a certain time period or a certain spatial area, or both.

In a specific implementation, the FMS 110 instantiates a publisher 141 in the network demand topic 140 and a subscriber 152 in the network QoS topic 150. Similarly, the NMS 120 instantiates a publisher 151 in the network QoS topic 150 and a subscriber 142 in the network demand topic 140. With this setup, the path planner 117 in the FMS 110 may access information relating to the achievable QoS through the subscribed network QoS topic 150, and more precisely via the subscriber 152. The network demand forecaster 116 predicts required network resources and publishes corresponding information so that it becomes available to the NMS 120 through the network demand topic 140. Further, the network resource allocator 127 in the NMS 120 generates a resource allocation plan based on predictive resource requests from the FMS 110, which are received through the subscribed network demand topic 140. The network QOS forecaster 126 publishes its output, for use by the FMS 110, using the network QoS topic 150.

As mentioned above, elements of the control network 100 may be implemented in compliance with current and future releases of 3GPP NR, and one such implementation will now be described in some greater detail. In the body of 3GPP specifications, some concepts of particular interest are:

- Common API Framework (CAPIF), which facilitates the specification of northbound Application Programming Interfaces (APIs) towards different cellular network functions; see for example different versions of 3GPP Technical Specification (TS) 23.222 "Common API Framework for 3GPP Northbound APIs",
- Service Capability Exposure Function (SCEF), which exposes services and capabilities provided by cellular network interfaces to third parties; see for example TS 22.101 "Service aspects; Service principles", TS 23.682 "Architecture enhancements to facilitate communications with packet data networks and applications", TS 29.122 "T8 reference point for Northbound APIs",
- Network Exposure Function (NEF), which exposes services and capabilities provided by cellular network functions to third parties and to other network functions; see for example TS 22.261 "Service requirements for the 5G system", TS 23.501 "System architecture for the 5G System (5GS)", TS 23.502 "Procedures for the 5G System (5GS)", TS 29.522 "5G System; Network Exposure Function Northbound APIs; Stage 3",
- Service Enabler Architecture Layer (SEAL) for Verticals, which specifies common 5G system services to be re-used by different vertical applications, e.g., to enable core capabilities and functionalities to be used across different verticals; see for example TS 23.434 "Service Enabler Architecture Layer for Verticals (SEAL); Functional architecture and information flows", TS 29.549 "Service Enabler Architecture Layer for Verticals (SEAL); Application Programming Interface (API) specification; Stage 3".

In this context, as also discussed in TS 29.549, a vertical application may be an application catering to a specific vertical, such as a fleet of MRs or a factory automation system; a vertical application layer (VAL) server may be the server application function of a specific VAL service; a northbound API may be a service API exposed to higher-layer API invokers, along the lines of TS 23.222.

In the framework of TS 23.434 (e.g., Release 17) and related specifications, the FMS 110 may be configured to act as—or include a physical or virtual entity which acts as—a vertical application layer (VAL) server. The WFD 135 carried by an MR 130 may act as a VAL UE, a VAL client or both. The NMS 120 may be configured to act as—or include a physical or virtual entity which acts as—a network resource management (NRM) server. The use of standard-compliant entities safeguards interoperability and allows the MRs 130 and various components of the control network 100 to be sourced from different manufacturers and/or easily replaced after deployment. The use of standard-compliant entities may also improve the data integrity and safety of the control network 100, and its resilience to external attacks.

Turning to the information exchanged between these entities, the network resource request from the FMS 110 may have the format of a Network resource adaptation request to the SS_NetworkResourceAdaptation API specified in clause 14 of TS 23.434. The SS_NetworkResourceAdaptation API generally enables the VAL server to communicate with the network resource management server for network resource adaptation over the NRM-S interface. Operations such as Reserve_Network_Resource and Request_Unicast_Resource are currently defined for the API. The Reserve_Network_Resource operation is initiated by a Network resource adaptation request from the VAL server, which may have the following format:

TABLE 1

Network resource adaptation request

| Information element | Status | Description |
| --- | --- | --- |
| Requester Identity | M | The identity of the VAL server performing the request. |
| List of VAL UE IDs | M (NOTE) | List consisting of one or more VAL UE IDs for whom the network resource adaptation occurs. |
| VAL group ID | M (NOTE) | The VAL group ID for whom the network resource adaptation occurs. |
| Resource adaptation requirement | M | The resource adaptation requirement corresponds to the VAL service QoS requirements as applied for a UE or group of UEs (E.g. bandwidth, resource). |

(NOTE):
Either of the information elements should be present.

The status code "M" represents a mandatory information element (IE). Accordingly, in the network resource adaptation request, the FMS 110 may cause the VAL server to specify either an individual MR identity, a list of individual MR identities or a group MR identity referring to multiple MRs 130. The NRM server replies with a Network resource adaptation response, as follows:

TABLE 2

Network resource adaptation response

| Information element | Status | Description |
| --- | --- | --- |
| Result | M | Result includes success or failure of the network resource adaptation with the underlying network. The response can also include an updated value for some of the parameters included in the network resource adaptation request (e.g. negotiation of resource offering) |

It is noted that the messages Resource request and Response within the Request_Unicast_Resource operation of the same API may be of equivalent use. Resource reservation operations may be relevant too.

When attending to a network resource request, the NMS 120 may obtain the location of the MR(s) 130 concerned in different ways. A first option is for the NMS 120 to instantiate a VAL server which subscribes to real-time location information for the MR(s) 130 provided by the SS_LocationInfoEvent API specified in clause 9 of TS 23.434. As mentioned, the WFDs 135 in the MRs 130 may act as VAL UEs. The location information may be based on network-assisted positioning or may be self-reported by the VAL UEs. A subscription request to this API may have the following format:

TABLE 3

Location information subscription request

| Information element | Status | Description |
|---|---|---|
| Identity | M | Identity of the requesting VAL user or VAL UE |
| Identities list | M | List of VAL users or VAL UEs whose location information is requested. |
| Time between consecutive reports | M | It indicates the interval time between consecutive reports |

This first option is feasible when the access network can be operated without significant early planning, in particular, if the NMS 120 is able to respond fast and reliably to a change of VAL UE location.

A second localization option leverages the fact that the future locations of the MR(s) 130, for which network resources are requested, is derivable from the output of the path planning performed in the FMS 110. In this embodiment, the Network resource adaptation request introduced in Table 1 is extended as follows:

TABLE 4

Network resource adaptation request (extended)

| Information element | Status | Description |
|---|---|---|
| Requester Identity | M | The identity of the VAL server performing the request. |
| List of VAL UE IDs | M (NOTE) | List consisting of one or more VAL UE IDs for whom the network resource adaptation occurs. |
| VAL group ID | M (NOTE) | The VAL group ID for whom the network resource adaptation occurs. |
| Resource adaptation requirement | M | The resource adaptation requirement corresponds to the VAL service QoS requirements as applied for a UE or group of UEs (E.g. bandwidth, resource). |
| VAL UE location | | The location or locations of the VAL UE IDs for whom the network resource adaptation occurs. |

(NOTE):
Either of the information elements should be present.

The new information element VAL UE location shall be recognizable by the NRM server, either by referring to areas proper to the network (e.g., cells, sectors, beam directions) or to map information available to both the VAL server (here: FMS 110) and the NRM server. For example, the location may be one of several pre-agreed or pre-identified areas of the facility, with a desired granularity. Information concerning such areas may be deposited in the respective map databases 114 and 124, which may optionally be synchronized at runtime or at scheduled intervals. Because the VAL UE location relates to a future location, corresponding to the time when the network resource adaptation takes effect, it may be of an approximate or predictive nature. If the FMS 110 (VAL server) becomes aware that the MR locations have changed significantly—and thus that the information in the VAL UE location element may be outdated—it may decide to submit a new network resource adaptation request, which overrides the initial one, or a resource modification request. Alternatively, it may be specified that the network resource adaptation request shall have a limited validity time, after which the NRM server is allowed to revert to a default configuration in respect of the VAL UEs concerned, notwithstanding a previous positive Network resource adaptation response. The limited validity time may be a constant or may be specified for each Network resource adaptation request in a new IE.

The network QOS forecaster 126 in the NMS 120 makes its output data available to the FMS 110 by posting a network QoS forecast. This information exchange may be supported by the SS_NetworkResourceAdaptation API and may constitute a new operation. In such operation, the VAL server of the FMS 110 may generate a Network QoS forecast request with the following example IE structure:

TABLE 5

Network QoS forecast request

| Information element | Status | Description |
|---|---|---|
| Requester Identity | M | The identity of the VAL server performing the request. |
| List of VAL UE IDs | M (NOTE) | List consisting of one or more VAL UE IDs whom the network QoS forecast shall relate to. |
| VAL group ID | M (NOTE) | The VAL group ID whom the network QoS forecast shall relate to. |
| VAL UE location | M (NOTE) | The location of the VAL UE IDs whom the network QoS forecast shall relate to. |
| VAL service | O | The VAL service which the network QoS forecast shall relate to. |

(NOTE):
Either of the information elements should be present.

Here, the status code "O" denotes an optional IE. The NRM server within the NMS 120 may respond by a Network QoS forecast. If the IE VAL service was empty in the Network QoS forecast request, the Network QoS forecast may have the following appearance:

TABLE 6

Network QoS forecast (general case)

| Information element | Status | Description |
|---|---|---|
| List of VAL UE IDs | M (NOTE) | List consisting of one or more VAL UE IDs whom the network QoS forecast relates to. |
| VAL group ID | M (NOTE) | The VAL group ID whom the network QoS forecast relates to. |
| VAL UE location | M (NOTE) | The location of the VAL UE IDs whom the network QoS forecast relates to. |
| VAL service QoS | M | Values of one or more QoS parameters. |

(NOTE):
Either of the information elements should be present.

Alternatively, if the VAL server wishes to have the predicted QoS confirmed in respect of a service specified in the IE VAL service, the NRM server shall produce a Network QoS forecast with the following content:

TABLE 7

Network QoS forecast (service-specific case)

| Information element | Status | Description |
|---|---|---|
| List of VAL UE IDs | M (NOTE) | List consisting of one or more VAL UE IDs whom the network QoS forecast relates to. |
| VAL group ID | M (NOTE) | The VAL group ID whom the network QoS forecast relates to. |
| VAL UE location | M (NOTE) | The location of the VAL UE IDs whom the network QoS forecast relates to. |
| VAL service | O | The VAL service which the network QoS forecast shall relate to. |

TABLE 7-continued

Network QoS forecast (service-specific case)

| Information element | Status | Description |
| --- | --- | --- |
| VAL service QoS | M | An indicator whether the QoS for the specified VAL service is sufficient or not. |

(NOTE):
Either of the information elements should be present.

The IE VAL service QoS may for example be Boolean, where the value TRUE corresponds to sufficient QoS for the service in equation. Either way, the IE VAL service QoS may be understood to be a QoS indicator.

In some embodiments, the Network QoS forecast may be specified to be valid for a certain duration. When the Network QoS forecast is no longer valid, recipients (including the VAL server) should consider it as unreliable and avoid using it as a basis for important decision-making, such as path planning. In other embodiments, the Network QoS forecast format is extended with an optional IE QoS validity time, as follows:

TABLE 8

Network QoS forecast (general case, limited validity time)

| Information element | Status | Description |
| --- | --- | --- |
| List of VAL UE IDs | M (NOTE) | List consisting of one or more VAL UE IDs whom the network QoS forecast relates to. |
| VAL group ID | M (NOTE) | The VAL group ID whom the network QoS forecast relates to. |
| VAL UE location | M (NOTE) | The location of the VAL UE IDs whom the network QoS forecast relates to. |
| VAL service QoS | M | Values of one or more QoS parameters. |
| QoS validity time | O | Time for which the network QoS forecast shall be considered reliable. |

(NOTE):
Either of the information elements should be present.

The IE QoS validity time may be a duration or an absolute time (referring to a network time base) at which the Network QoS forecast expires. The option of using an absolute expiry time may be particularly convenient if difficulties are foreseen for the recipients of the Network QoS forecast to accurately determine its time of issuance.

As an alternative to an exchange of messages between the NMS 120 and the FMS 110, the Network QoS forecast may be generated by the NMS 120 of its own motion. The NMS 120 may be configured to post, via the NRM server, the Network QoS forecast in a suitable topic of a PubSub service. For example, the network QoS topic 150 illustrated in FIG. 1 may be used. Since the recipients (subscribers) of the Network QoS forecast are in general unknown by the NRM server, its content cannot be tailored to a specific recipient. The format of the Network QoS forecast may therefore be reduced compared to Table 6. More precisely, the Network QoS forecast might not include the IE List of VAL UE IDs, and the IE VAL UE location may be optional. The IE VAL service (see Table 7) may remain as an optional IE, with an understanding that if the NRM server periodically posts Network QoS forecasts for one or more representative VAL services, the subscribers may be able to use them to develop a practically useful understanding of the current operating condition of the network. The representative services may include one high-throughput service, one low-latency service, one high-reliability service and so forth.

As mentioned above, the FMS 110 may consider the content of the network QoS forecast when performing its path planning, e.g., to avoid instructing an MR 130 to pass via areas of the facility where the NMS 120 deems network congestion to be currently so significant that QoS fluctuations (or jitter) may be expected. The extra energy cost of having the MR 130 make a detour may be justified in view of higher aims, such as safeguarding incident-free operation and increasing the overall productivity of the MR fleet.

Figure 2:
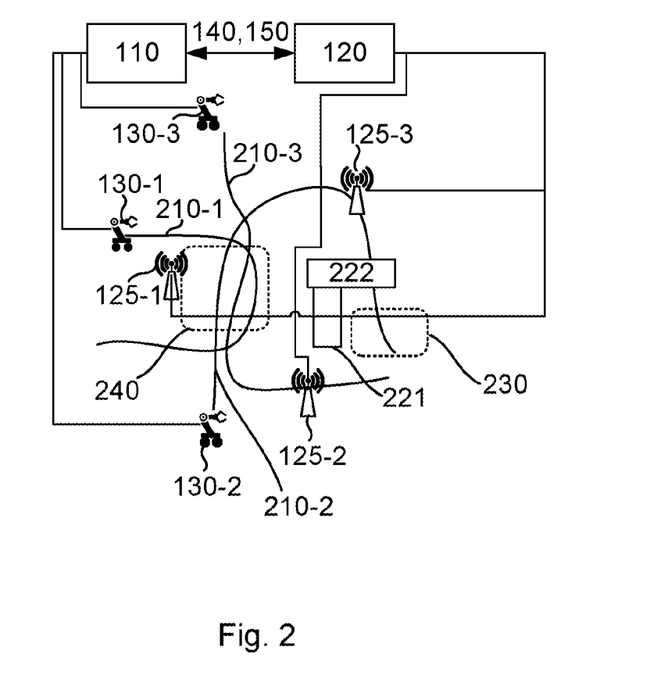
FIG. 2 illustrates path planning for the mobile robots, which takes into account obstacles, areas with poor radio coverage and areas with a risk of congestion.

FIG. 2 illustrates the control network's 100 path planning for the MRs 130, which takes into account obstacles 221, 222, areas with poor radio coverage 230 and areas with a risk of congestion 240 in the facility. The FMS 110, the NMS 120 and the interconnecting publication-subscription services 140, 150 are shown in an upper portion of FIG. 2. Logical communicative connections drawn in solid line are shown between the FMS 110 and MRs 130 on the one hand and between the NMS 120 and WAPs 125 on the other. Physically, data from the FMS 110 to an MR 130 may pass initially via the global Internet, via a core network associated with the access network, via one of the WAPs 125 and finally over the wireless interface between the WAP 125 and a WFD 135 in the MR 130. It is understood that the WFD 135 may at times receive control data from the core network or access network relating to the network operations.

Tentative motion paths 210 of the MRs 130 are drawn as curved line segments in FIG. 2. All three paths 210 pass through a certain area 240 of the facility, which is therefore potentially congested. The second path 210-2 passes through the area 230 which is known, e.g., on the basis of a network QoS forecast, to have poor wireless coverage. These factors tend to reduce the suitability of the paths, particularly the suitability of the second path 210-2, and may within the path planning process of the FMS 110 be balanced against other factors. The second path 210-2 additionally interferes with an obstacle 222; the path planner may treat such interfering, on its own, as a fact which disqualifies the second path 210-2 from execution, no matter how suitable it may be in other regards. The path planning process may then be relaunched to generate an executable path for the second MR 130-2.

Network congestion in the area 240, which may be a condition where the network approaches a local overload state, arises as a result of the relatively large number of MR paths 210 passing through it. Causally, this network congestion is at least indirectly related to the path planning performed by the FMS 110, and may also be alleviated or cured if the FMS 110 reruns the path planning based on partially different input data, to have the MR paths 210 altered. Indeed, as illustrated by several embodiments described above, the FMS 110 may take forecasted network performance (e.g., QoS) into account when generating the MR paths 210. It may be a network QoS forecast from the NMS 120 that notifies the FMS 110 of the existence of the potentially congested area 240. Conversely, the activities in the NMS 120—notably the resource allocation—may be designed to counteract or compensate local shortages of network resources. As these examples show, between the FMS's 110 path planning and the NMS's 120 allocation of resources to the access network, a mutual interaction may occur that could even have a self-referential behavior.

By adjusting adequate settings of the control network 100, it is possible to reduce or amplify such self-referential behavior, if any exists. The self-referential behavior may sometimes be valuable when it leads to convergence towards a highly accurate path planning result. At other times, it could lead to oscillations and/or occupy computational resources unnecessarily. To ensure a desired degree of interaction between the FMS's 110 path planning and the NMS's 120 allocation of resources to the access network, a micro-protocol may specify the sequence and number of repetitions of the following actions:

(1) the NMS 120 generates a network QoS forecast;
(2) the FMS 110 performs path planning based on higher-level requirements (e.g., a utility task to be executed), map information and/or a most recent network QoS forecast from the NMS 120;
(3) the FMS 110 generates a network resource request based on a most recent (and possibly tentative) output of the path planning;
(4) the NMS 120 allocates network resources in accordance with a most recent network resource request;
(5) the FMS 110 executes the planned paths.

In this notation, some possible micro-protocols are: A=(2, 3, 4, 5), B=(1, 2, 3, 4, 5), C=(2, 3, 4, 1, 2, 3, 4, 5), D=(1, 2, 3, 4, 1, 2, 3, 4, 5), E=(2, 1s, 2, 1s, ... , 2, 1s, 5). Micro-protocol D may be extended with additional copies of the sequence (1, 2, 3, 4) before action 5. The actual number of repetitions may be determined at runtime based on a convergence criterion. In micro-protocol E, where "1s" denotes a Boolean-valued service-specific Network QoS forecast (see Table 7), the FMS 110 iterates (" . . . ") the path planning step until the Network QoS forecast indicates that a sufficient QoS is predicted for the tentative paths. The number of iterations may be limited to not exceed a predefined maximum number.

Figure 3:
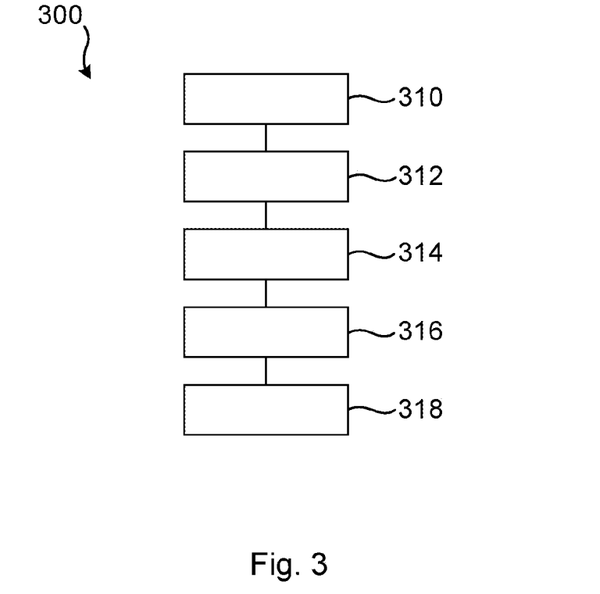
FIG. 3 is a flowchart of a method according to the invention.

FIG. 3 is a flowchart of a method 300 for supporting one or more mobile robots 130 operable in a facility equipped with an access network 125. The method 300 may be implemented by processing circuitry in a control network 100 of the type shown in FIG. 1 or by a standalone programmable computer.

In a first step 310 of the method 300, a path-planning process (e.g., a computing process) is executed on the basis of input that specifies at least one task of the mobile robots 130.

In a second step 312, authorization to control movement of the mobile robots 130 is given to the path-planning process.

In a third step 314, a predictive network resource request is derived from an output of the path-planning process.

In a fourth step 316, a network resource allocation process (e.g., a computing process) is executed on the basis of the predictive network resource request. The network resource allocation process is preferably independent from the path-planning process.

In a fifth step 318 of the method 300, authorization to configure the access network is given to the network resource allocation process.

With respect to the second 312 and fifth 318 steps, the respective authorizations are preferably to be given to the path-planning process and the network resource allocation process with exclusivity. Overlapping responsibilities are to be avoided.

Embodiments disclosed herein may be expected to manage larger MR fleets by means of the logically centralized FMS 110 (which may be implemented in a physically distributed fashion) and to manage more sophisticated network infrastructure by the logically centralized NMS 120 (which may as well be physically distributed). In operation, the FMS 110 and the NMS 120 may exchange information in a more real-time-like manner and more efficiently by the use of publication-subscription. This may be in the interest of the mutually interacting processes of control and optimization, since too slow feedback may result in unwanted resonance or oscillation of the control loops involved.

The MR fleet and the network infrastructure are functionally and/or structurally decoupled by virtue of the PubSub. This may entail that the NMS 120 is not required to access low-level information relating to states of the MRs 130. The decoupling may furthermore entail that the FMS 110 need not access low-level information relating to the wireless access network. The control network 100 thereby becomes more compatible with the architecture and ecosystem of 5G.

Embodiments herein may contribute to deeper coordination and closed-loop optimization between the FMS 110 and the NMS 120. The FMS 110 may proactively respond to information it receives from the NMS 120. Network congestion or poor QoS may be avoided by more intelligent path planning. Poor QoS may be tolerated or handled by suitable adaptations, such as adjustments of MR speed, task execution speed (e.g., cycle time), precision, or the like. The FMS 110 may furthermore forecast the MRs' 130 needs for network resources and QoS, considering both ultra-reliable low-latency communications (URLLC) and large-bandwidth demands, such as video streams. The NMS 120, for its part, may proactively respond to the information from the FMS 110, by reserving necessary network resources, forecasting potential degradation of QoS, and/or updating key performance indicators (KPIs) of network performance.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A control network for supporting one or more mobile robots operable in a facility, comprising:
    a fleet management system, FMS, authorized to perform path planning and path execution for the one or more mobile robots; and
    a network management system, NMS, authorized to configure and perform resource allocation in an access network, which is operable to provide the one or more mobile robots with wireless connectivity in the facility,
    wherein the respective authorities of the FMS and the NMS are mutually exclusive,
    wherein the FMS is configured to generate, on the basis of the path planning, a predictive network resource request and share the predictive network resource request with the NMS.

2. The control network of claim 1, wherein the FMS is configured to specify an identity of the FMS, at least one mobile robot identity and a quality-of-service, QoS, requirement in the network resource request.

3. The control network of claim 2, wherein the NMS is configured to subscribe to location information for the at least one mobile robot identity in the network resource request.

4. The control network of claim 2, wherein the FMS is configured to further specify a future location for the at least one mobile robot identity in the network resource request.

5. The control network of claim 2, wherein the NMS is configured to generate a QoS forecast and share the QoS forecast with the FMS.

6. The control network of claim 1, wherein the NMS is configured to generate a QoS forecast and share the QoS forecast with the FMS.

7. The control network of claim 6, wherein the FMS is configured to request the QoS forecast from the NMS.

8. The control network of claim 6, wherein the FMS is configured to subscribe to the QoS forecast.

9. The control network of claim 6, wherein the NMS comprises:
   a network resource allocator configured to maintain a network resource allocation plan; and
   a network Qos forecaster configured to generate the QoS forecast on the basis of the network resource allocation plan.

10. The control network of claim 9, wherein the network resource allocator is configured to update the network resource allocation plan on the basis of the predictive network resource request.

11. The control network of claim 6, wherein the FMS comprises a path planner configured to perform the path planning on the basis of the QoS forecast.

12. The control network of claim 1, further comprising a publication-subscription service configured to facilitate the sharing of the predictive network resource request and/or the QoS forecast between the FMS and the NMS.

13. A computer-implemented method for supporting one or more mobile robots operable in a facility equipped with an access network, the computer-implemented method comprising:
   executing a path-planning process on the basis of input specifying at least one task of the one or more mobile robots;
   authorizing the path-planning process to control movement of the one or more mobile robots;
   deriving a predictive network resource request from an output of the path-planning process;
   executing a network resource allocation process, which is independent from the path-planning process, on the basis of the predictive network resource request; and
   authorizing the network resource allocation process to configure the access network.

14. The computer-implemented method of claim 13, wherein the network resource allocation process generates a QoS forecast upon a request by the path-planning process.

15. A non-transitory computer-readable medium having a computer program stored thereon, the computer program comprising instructions to perform a method for supporting one or more mobile robots operable in a facility equipped with an access network, the method including:
   executing a path-planning process on the basis of input specifying at least one task of the one or more mobile robots;
   authorizing the path-planning process to control movement of the one or more mobile robots;
   deriving a predictive network resource request from an output of the path-planning process;
   executing a network resource allocation process, which is independent from the path-planning process, on the basis of the predictive network resource request; and
   authorizing the network resource allocation process to configure the access network.

* * * * *